United States Patent
Kitamura et al.

(10) Patent No.: US 6,937,381 B2
(45) Date of Patent: Aug. 30, 2005

(54) OPTICAL PICKUP DEVICE

(75) Inventors: Kazuya Kitamura, Tenri (JP); Yukio Kurata, Tenri (JP); Tetsuo Iwaki, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/483,859

(22) PCT Filed: Aug. 13, 2002

(86) PCT No.: PCT/JP02/08265

§ 371 (c)(1),
(2), (4) Date: Jan. 14, 2004

(87) PCT Pub. No.: WO03/098615

PCT Pub. Date: Nov. 27, 2003

(65) Prior Publication Data

US 2004/0169908 A1 Sep. 2, 2004

(30) Foreign Application Priority Data

Aug. 24, 2001 (JP) .................................. 2001-253735

(51) Int. Cl.[7] .............................. G02F 1/10; G11B 7/00; G11B 7/135
(52) U.S. Cl. .............. 359/279; 369/112.01; 369/112.02; 369/112.23
(58) Field of Search ................................ 359/279, 719, 359/724; 369/106, 112.01, 112.02, 112.23, 124.14

(56) References Cited

U.S. PATENT DOCUMENTS 5,936,923 A 8/1999 Ootaki et al.
6,084,843 A 7/2000 Abe et al. .............. 369/112.07

FOREIGN PATENT DOCUMENTS

| JP | 10-123410/1998 | 5/1998 | .......... G02B/13/00 |
| JP | 10-261240 | 9/1998 | .......... G11B/7/125 |
| JP | 2001-143303 | 5/2001 | .......... G11B/7/135 |
| JP | 2001-331964 | 11/2001 | .......... G11B/7/135 |
| JP | 2002-109776 | 4/2002 | .......... G11B/7/135 |
| JP | 2002-148581 | 5/2002 | ............. G02F/1/13 |

OTHER PUBLICATIONS

Takuji Nomura and Kouichi Murata "Compensation for wave front aberration using liquid crystal device with smooth index profile" (Technical Report of IEICE., CPM2000–91 (Sep. 2000), p. 1–6), (partial translation).

*Primary Examiner*—David N. Spector
(74) *Attorney, Agent, or Firm*—David G. Conlin; Peter J. Manus; Edwards & Angell, LLP

(57) ABSTRACT

An optical pickup device which includes (A) a light source, and (B) an objective lens and an aberration correcting optical system which are located in a light path from the light source to an optical recording medium is so arranged that the aberration correcting optical system imparts a phase distribution to luminous flux which transmits the aberration correcting optical system, so as to correct a predetermined aberration; and an amount of phase of the aberration correcting optical system when correcting the aberration is set in such a manner that the aberration correcting optical system imparts a larger amount of phase at a position farther from a point where the aberration correcting optical system crosses an optical axis of light emitted from the light source. With this, it is possible to increase a tolerance for the center misalignment of the objective lens so as to reduce aberration caused by the center misalignment.

8 Claims, 6 Drawing Sheets

OPTICAL PICKUP DEVICE

This application claims priority pursuant to 35 USC 371 from PCT international application No. PCT/JP02/08265 filed Aug. 13, 2002, which in turn claims priority from Japanese application No. 2001-253735 filed Aug. 24, 2001, the disclosures of which are incorporated herein by reference.

TECHNICAL FIELD

The present invention relates to optical pickup devices for recording and reproducing information on and from an optical information recording medium.

BACKGROUND ART

Optical technology has many characteristics such as capability of high-speed processing at a frequency of light (speed is high because of high frequency), capability of spatial information processing, and capability of phase processing. For this reason, the optical technology has been researched, developed, and put into practical use in a wide range of fields such as communications, measurement, and processing.

Such optical technology uses a high-precision objective lens to focus a light beam.

In accordance with a recent growing demand particularly for image recording devices utilizing light, technique aiming to increase the storage capacity of an optical information recording medium has become quite important. In order to increase the storage capacity of an optical information recording medium, the quality of the recording medium needs to be improved, and what is more, a beam spot needs to have a smaller diameter, namely the objective lens needs to sufficiently focus the beam spot.

As is well known, the diameter of the beam spot is proportional to the wavelength of light, and is inversely proportional to the NA (Numerical Aperture) of the objective lens. In other words, it is necessary to either shorten the wavelength of light or increase the NA of the objective lens, in order to focus the beam spot having a smaller diameter.

In order to shorten the wavelength of light, a blue laser diode and a blue or green SHG laser have been recently developed. On the other hand, in order to increase the NA of the objective lens, a higher density has been achieved in DVD (Digital Versatile Discs) whose NA is 0.6 compared with CD (Compact Disc) whose NA is 0.45. Further, Japanese Unexamined Patent Publication No. 123410/1998 (Tokukaihei 10-123410, published on May 15, 1998) discloses an optical pickup device aiming to have an increased density. This optical pickup device uses a 2-group lens in which two lenses are combined, so that the objective lens has an NA of 0.85.

The optical pickup device which uses the objective lens having a high NA as described above is required to correct (i) unevenness in thickness of a light transmission layer of an optical recording medium and (ii) a spherical aberration which occurs in multi-layer recording. For example, Japanese Unexamined Patent Publication No. 143303/2001 (Tokukai 2001-143303, published on May 25, 2001) discloses a liquid crystal element which corrects the spherical aberration.

The liquid crystal element of the foregoing Publication is arranged such that liquid crystal is sandwiched between electrodes which are respectively formed on glass substrates. In order to correct the spherical aberration, the liquid crystal element applies a voltage to the electrodes so as to change the alignment of the liquid crystal. This changes a refractive index of the liquid crystal, thereby forming a phase distribution.

As an example, the following describes a system in which the objective lens has an NA of 0.85 and the light transmission layer of the optical recording medium has a thickness of 0.1 mm. In the event where a light transmission layer with a thickness of 0.115 mm is used, a phase distribution as shown in FIG. 8 is imparted to the liquid crystal element so as to correct the spherical aberration caused by the increased thickness. This phase distribution is for a spherical aberration corresponding to the increased thickness (+15 $\mu$m) of the light transmission layer, and it is required to correct a spherical aberration remaining on a best image plane after focusing. In other words, the phase distribution is formed to reduce spherical aberration, and it is required to correct a spherical aberration that remains after the objective lens was moved in a direction of the optical axis in the focus operation that is carried out to match a recording-reproducing surface with the best image plane on which a wavefront aberration is the smallest.

FIG. 9 shows a relationship between radius r of the liquid crystal element and the second derivative of the phase distribution, wherein the second derivative indicates the rate of change (rate of fluctuation) in the slope of the phase. As shown in FIG. 9, the phase distribution has two inflection points. Further, the graph of FIG. 9 has considerably large values at outermost portions of the effective light beam. Here, imparting such a phase distribution to the liquid crystal element does not cause a problem when the central axis of the liquid crystal element is aligned with the central axis of the objective lens. However, when the central axis of the liquid crystal element and the central axis of the objective lens are misaligned with each other even slightly in the radius direction of the liquid crystal element and the objective lens, the wavefront of incident light on the objective lens is greatly disturbed, thereby causing a large aberration.

Therefore, the foregoing arrangement has a problem that the characteristics largely deteriorate due to the center misalignment of the liquid crystal element with the objective lens. Further, the liquid crystal element and the objective lens need to be precisely aligned with each other in order to prevent deterioration of the characteristics, thereby forcing complicated work on a user. Further, when the objective lens mounted on an actuator is moved in a direction perpendicular to the optical axis and perpendicular to the tracking direction in order to carry out a tracking operation, the center misalignment occurs such that the optical axis of the light beam entering the objective lens is misaligned with the central axis of the objective lens. Because such center misalignment is not allowable, it is also necessary to mount both the objective lens and the liquid crystal element together on the actuator.

Further, in order to allow linearly polarized light to enter the liquid crystal element, it is necessary to provide a quarter-wave plate at a position closer to the optical recording medium than the liquid crystal element, namely on the actuator. This increases the weight of parts mounted on the actuator (weight of moving parts), and thus prevents high-speed driving, making it difficult to increase the speed of recording and reproducing.

Another problem of mounting the liquid crystal element on the moving part (actuator) is that it becomes difficult to route lead wires for applying a voltage to the liquid crystal element, or to position a flexible substrate.

In view of the foregoing problems, the present invention has an objective to provide an optical pickup device for reducing the aberration caused by position misalignment of the liquid crystal element with the objective lens, even if the objective lens has a high NA.

DISCLOSURE OF INVENTION

In order to attain the foregoing object, an optical pickup device of the present invention which includes a light source; and an objective lens and an aberration correcting optical system which are located in a light path from the light source to an optical recording medium is so arranged that the aberration correcting optical system has a phase distribution for a light beam passing through the aberration correcting optical system, so as to correct a predetermined aberration; and the aberration correcting optical system for correcting an aberration is set so that a magnitude of a phase in the phase distribution increases with increase in distance from a point where the aberration correcting optical system crosses an optical axis of light emitted from the light source.

With this arrangement, even if the center of the objective lens is not aligned with the center of the aberration correcting optical system, the rate of change in the slope of the phase is small because a magnitude of a phase monotonously changes. Therefore, the center misalignment does not cause a large aberration if the objective lens and the aberration correcting optical system have been appropriately adjusted in a state having no center misalignment.

This eliminates the need for mounting both the objective lens and the aberration correcting optical system together on an actuator, for example.

The weight of the actuator can thus be reduced, thereby providing an optical pickup device capable of driving the actuator at high speed.

The optical pickup device of the present invention may be arranged so that the aberration correcting optical system for correcting an aberration is set so that a magnitude of a phase in the phase distribution increases with increase in distance from a point where the aberration correcting optical system crosses an optical axis of light emitted from the light source within an effective diameter of the aberration correcting optical system.

Further, in order to attain the foregoing object, the optical pickup device of the present invention is arranged so that the phase distribution of the aberration correcting optical system is approximated by a function $$\Phi(r) = a \times r^4 + b \times r^2,$$

where $\Phi(r)$ is a phase at a radius r, r is a radius, and a and b are phase distribution coefficients.

With this arrangement, it is possible to easily realize the foregoing arrangement in which a magnitude of a phase in the phase distribution increases with increase in distance from a point where the aberration correcting optical system crosses an optical axis of light emitted from the light source.

Further, the phase distribution of the foregoing arrangement can be easily realized by adjusting a voltage distribution applied to the liquid crystal element, when the liquid crystal element, for example, is used as the aberration correcting optical element.

Therefore, it is possible to easily realize the optical pickup device of the present invention.

In order to attain the foregoing object, the optical pickup device of the present invention is arranged so that the phase distribution coefficients a and b satisfy:

$$a \times b > 0; \text{ or}$$

$$a \times b < 0 \text{ and } \{-b/(6 \times a)\}^{(1/2)} > R,$$

where R is an effective radius of the aberration correcting optical system.

With this arrangement, since the phase distribution of the aberration correcting optical system contains no inflection point within the effective radius of the aberration correcting optical system, the second derivative $\Phi''(r)$ of the phase distribution, which indicates the rate of change in the slope of the phase, can have a small value even when the centers of the objective lens and the aberration correcting optical system are misaligned. This ensures that aberration is reduced. In order to attain the foregoing object, the optical pickup device of the present invention may be arranged so that the phase distribution coefficient a satisfies:

$$|12 \times a \times R^2| < 0.002.$$

With this arrangement, the aberration can be reduced to 0.03 λrms or smaller in the optical system having an NA of 0.85, when the amount of shift of the objective lens is assumed to be approximately 0.3 mm.

In order to attain the foregoing object, the optical pickup device of the present invention is so arranged that the objective lens has an NA of not less than 0.75; and the aberration correcting optical system comprises a liquid crystal element.

With this arrangement, it is possible to carry out recording and reproducing at high density by sufficiently focusing a beam spot, because the objective lens has a high NA. Further, it is possible to easily correct an aberration because the liquid crystal element is used as the aberration correcting optical element.

Further, in order to attain the foregoing object, an optical pickup device of the present invention which includes an aberration correcting optical element for changing a wavefront of incident light passing through the aberration correcting optical element, the wavefront being an equiphase surface, is so arranged that the aberration correcting optical element includes an electrode formed on a substrate, an optical medium whose refractive index with respect to the incident light changes in accordance with a voltage applied to the electrode, and a driving circuit which applies a voltage to the electrode; the driving circuit applies a voltage to the electrode so as to change the refractive index of the optical medium and thereby shift a phase of the wavefront of the incident light passing through the optical medium; and the driving circuit applies a voltage to the electrode so that an amount of phase shift caused by the optical medium monotonously increases or decreases in accordance with a distance from an optical axis of the incident light.

In the optical pickup device of the foregoing arrangement, incident light from, for example, the light source falls on the objective lens via the aberration correcting optical element. The light passes through the objective lens and is condensed on a recording surface of an optical disk, for example. The reflected light from the optical disk may be read to reproduce information recorded on the optical disk. Further, the condensed light may be used to record information on the recording surface. With the foregoing arrangement, an aberration of the light condensed on the recording surface via the objective lens can be eliminated by suitably changing the wavefront of incident light, using the aberration correcting optical element, for example.

With this arrangement, even if the center of the objective lens is not aligned with the center of the aberration correcting optical system, the rate of change in the slope of the phase is small because an amount of phase shift monotonously changes. Therefore, the center misalignment does not cause a large aberration if the objective lens and the aberration correcting optical system have been appropriately adjusted in a state having no center misalignment.

In order to attain the foregoing object, the optical pickup device of the present invention is so arranged that the driving circuit applies a voltage to the electrode so as to form a phase distribution as a function of radius r when R>r>0:

$$\Phi(r)=a\times r^4+b\times r^2,$$

where the radius r is the distance from the optical axis of the incident light, and R is an effective radius of the aberration correcting optical system.

With this arrangement, it is possible to realize the above-described arrangement in which an amount of phase shift caused by the optical medium monotonously increases or decreases in accordance with a distance from an optical axis of the incident light.

In order to attain the foregoing object, the optical pickup device of the present invention is so arranged that the driving circuit applies a voltage to (A) a center electrode which is located on the optical axis of the incident light and (B) a circular electrode which is located around the center electrode, so that an amount of phase shift caused by the optical medium monotonously increases or decreases in accordance with the distance from the optical axis of the incident light.

With this arrangement, it is possible to easily realize the foregoing arrangement by applying a voltage to the central electrode and one or more circular electrodes so that the electrodes respectively have predetermined voltages.

For a fuller understanding of the nature and advantages of the invention, reference should be made to the ensuing detailed description taken in conjunction with the accompanying drawings.

BEST MODE FOR CARRYING OUT THE INVENTION

The following will explain an embodiment of the present invention with reference to attached drawings.

Figure 1:
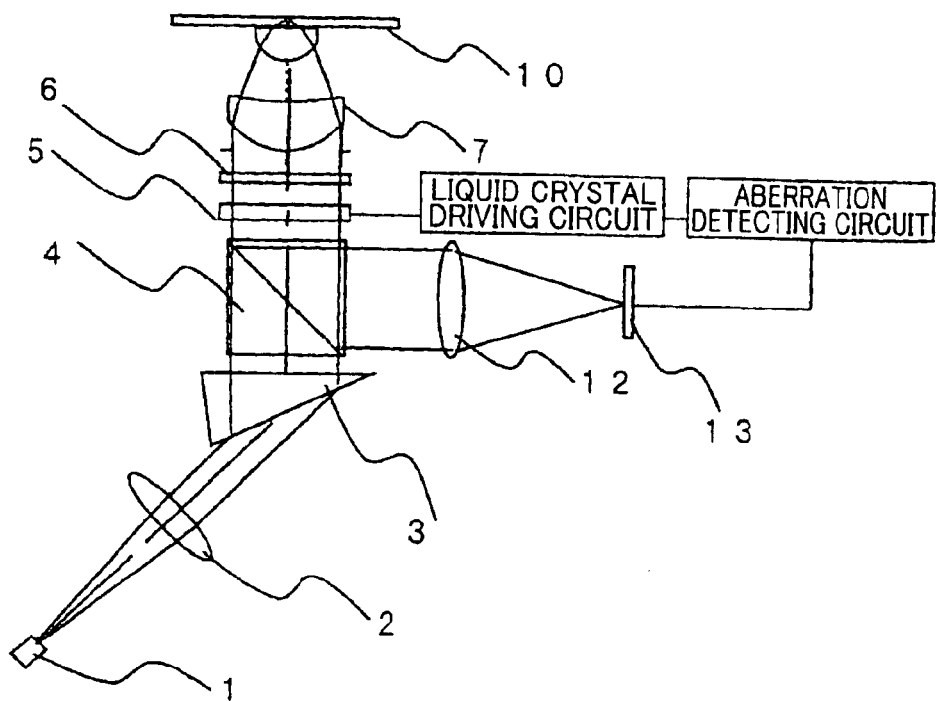
FIG. 1 is a block diagram showing an embodiment of an optical pickup device of the present invention.

As shown in FIG. 1, an optical pickup device of the present embodiment is so arranged that linearly polarized laser beam emitted from an LD (Laser Diode) 1 is converted into a parallel ray at a collimator lens 2 and enters a shaping prism 3. The shaping prism 3 shapes an elliptical intensity distribution of the laser beam emitted from the LD 1 so that the intensity distribution has an approximately circular shape.

After this, the light exiting from the shaping prism 3 passes through a polarizing bean splitter 4, and enters an aberration correcting optical system 5. Then, the light is converted into circularly polarized light at a quarter-wave plate 6. The ray of light that is converted into circularly polarized light by the quarter-wave plate 6 is deflected by a 45-degree mirror (not shown), and an objective lens 7 focuses the light onto an optical recording medium 10.

Figure 2:
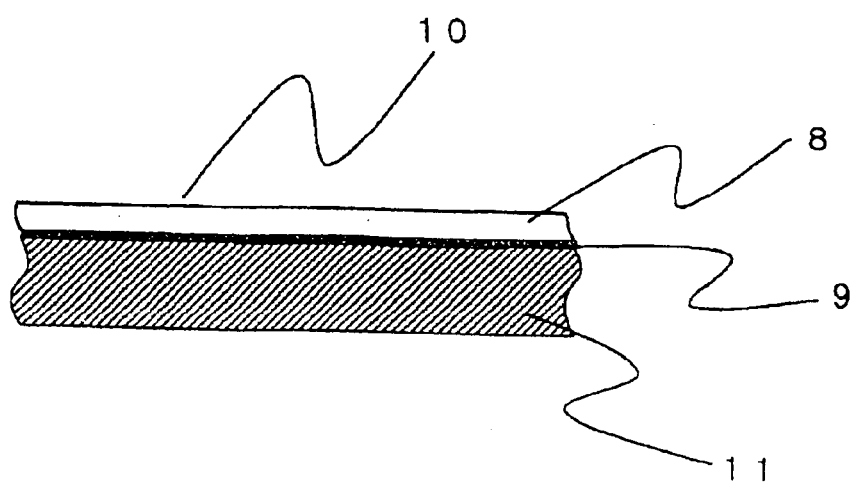
FIG. 2 is a cross-sectional view of an optical recording medium of FIG. 1.

Note that, the optical recording medium 10 is composed of a light transmission layer 8 having a thickness of approximately 0.1 mm (median and mean of the thickness are 0.1 mm), a recording surface 9, and a substrate 11, as shown in FIG. 2. Referring to FIG. 1, the objective lens 7 focuses light on the optical recording medium 10. More specifically, the light focused by the objective lens 7 (FIG. 1) passes through the light transmission layer 8, forms a beam spot on the recording surface 9, and follows the path as described below after being reflected by the recording surface 9.

Namely, the light reflected by the recording surface 9 (FIG. 2) is restored to linearly polarized light by the quarter-wave plate 6, as shown in FIG. 1. Note that, the light is restored to the linearly polarized light so that (i) the polarization direction of the light that enters the quarter-wave plate 6 through the polarizing beam splitter 4 and (ii) the polarization direction of the light that is reflected by the optical recording medium 10 and enters the polarizing beam splitter 4 via the quarter-wave plate 6 are rotated by 90 degrees from each other.

The light that is restored to the linearly polarized light by the quarter-wave plate 6 is bent at a substantially right angle by the polarizing bean splitter 4. Then, the light passes through a condensing lens 12 and enters a light-receiving section 13.

Note that, the objective lens 7 is anchored on a lens holder (not shown). Further, the lens holder is fixed to an optical pickup device main unit (not shown) with four wires (not shown). Further, the objective lens 7 of the present embodiment has an NA of 0.85. The objective lens 7 is designed so that it has almost no aberration when a parallel ray enters the objective lens 7 (so-called infinite conjugation) and when the light transmission layer 8 has a thickness of 0.1 mm. Note that, in the present embodiment, the laser beam emitted from the LD 1 has a wavelength of 405 nm, the diameter of an effective ray is $\phi 3$, and the focal length is 1.76 mm.

An aberration detecting circuit calculates an amount of spherical aberration based on an optical signal detected by the light-receiving section 13. A liquid crystal driving circuit drives a liquid crystal element of the aberration correcting optical system 5 in accordance with a signal regarding the calculated amount of spherical aberration. The liquid crystal element will be described later. Note that, the spherical aberration may be detected by either observing an amplitude and envelope of an RF signal or providing a light-receiving section that can detect spherical aberration.

Figure 3:
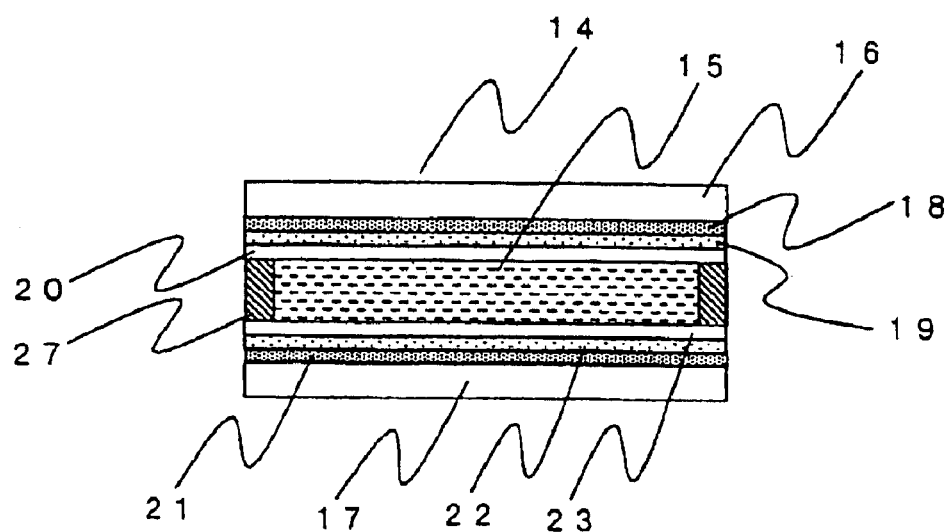
FIG. 3 is a block diagram of an aberration correcting optical system of FIG. 1.

As shown in FIG. 3, the aberration correcting optical system 5 is a liquid crystal element 14 made of a nematic liquid crystal composition commonly used for liquid crystal displays and the like. More specifically, the liquid crystal element 14 is arranged so that liquid crystal 15 is sandwiched between a pair of transparent electrodes which face each other. The transparent electrode is prepared by, for example, depositing an ITO film on a glass substrate. In this arrangement, the alignment direction of liquid crystal molecules in the liquid crystal 15 can be changed from horizontal to vertical by adjusting a voltage applied across the transparent electrodes. Further, the liquid crystal 15 has birefringence, in which a refractive index in a direction of the optical axis and a refractive index in a direction perpendicular to the optical axis are different from each other in the liquid crystal molecules. With this, the incident light on one side of the liquid crystal element 14 passes through the liquid crystal and is subjected to birefringent effect therein in accordance with the alignment state of the liquid crystal 15. The light then emerges from the other side of the liquid crystal element 14. Therefore, the light that enters the liquid crystal element 14 becomes linearly polarized light whose polarization direction is determined by the alignment method of the liquid crystal 15.

The liquid crystal element 14 includes a first glass plate 16, the liquid crystal 15, and a second glass plate 17. The liquid crystal 15 is sandwiched between the first glass plate 16 and the second glass plate 17 which face each other.

A transparent electrode (electrode) 18, an insulating layer 19, and an alignment layer 20 are formed on the first glass plate 16. On the other hand, a transparent electrode (electrode) 21, an insulating layer 22, and an alignment layer 23 are formed on the second glass plate 17. The electrode 21 is a common electrode having a circular shape. The liquid crystal 15 is sealed with a sealing material 27.

Figure 4A:
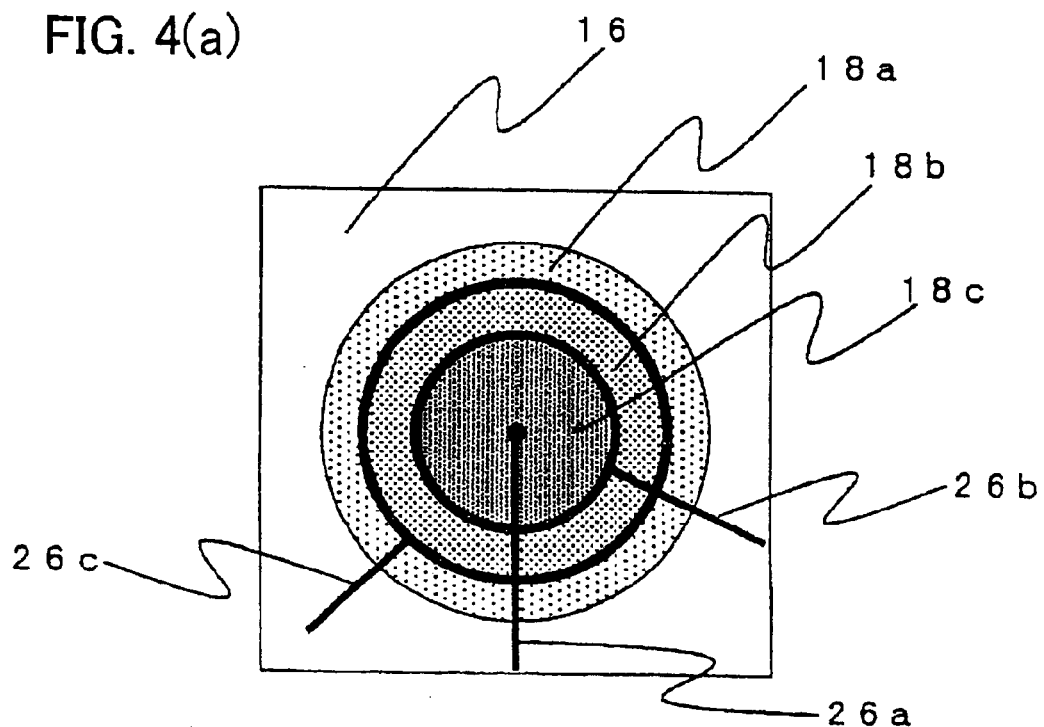
FIG. 4(a) is a plan view showing how electrodes are arranged in the liquid crystal element of FIG. 3.

Further, as shown in FIG. 4(a), the transparent electrode 18 on the first glass plate 16 includes electrodes 18a, 18b, and 18c which are respectively formed in separate concentric areas. The transparent electrode 18 further includes metal electrodes 18d, one of which is formed on the center of the electrode 18c, and the others are respectively formed on border lines of the divided areas. Further, the metal electrodes 18d are respectively connected with lead wires 26a, 26b, and 26c. Note that, the transparent electrode 21 on the second glass plate 17 is a common electrode having a circular shape.

Figure 4B:
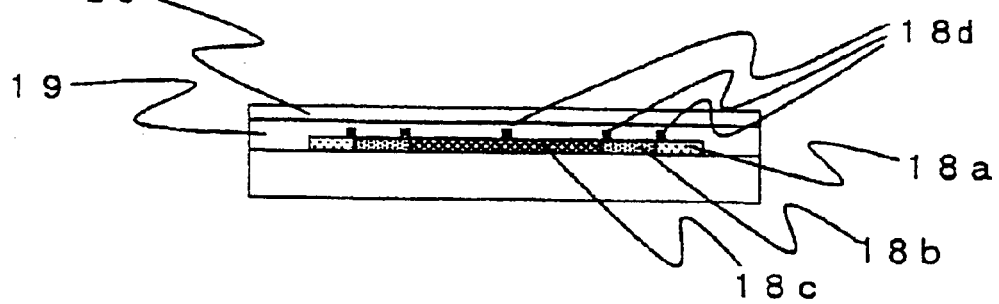
FIG. 4(b) is a cross-sectional view showing how the electrodes are arranged in the liquid crystal element of FIG. 3.
Figure 4C:
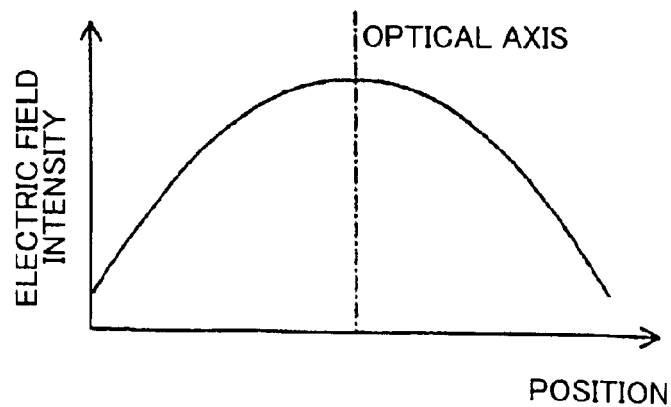
FIG. 4(c) is a graph showing a relationship between position and electric field intensity in the liquid crystal element.

As shown in FIG. 4(b), the transparent electrode 18 is arranged by combining the transparent electrodes (such as ITO) 18a through 18c having high resistance and the metal electrodes (such as gold and aluminum) 18d having low resistance. With this arrangement, the transparent electrode 18 can form the electric field distribution in which the electric field is largest at the central portion and becomes smaller toward the peripheral portions as shown in FIG. 4(c). This generates a phase difference in the liquid crystal 15 (FIG. 3), thereby eliminating the aberration.

More specifically, by applying voltages V1=4V, V2=2V, and V3=1V respectively to the lead wires 26a, 26b, and 26c for example, the transparent electrode 18 can form the electric field distribution as shown in FIG. 4(c) such that the field intensity is largest at the central portion of the transparent electrode 18 and becomes gradually smaller toward the peripheral portions of the transparent electrodes 18. This enables the aberration correcting optical system 5 to impart a small refractive index at the central portion, and a gradually larger refractive index toward the peripheral portions.

Namely, by respectively controlling voltage values for the electrodes 18a, 18b, and 18c formed on the first glass substrate, it is possible to form a voltage distribution and thereby a refractive index distribution in accordance with the voltage distribution. This is because the refractive index of the liquid crystal changes as the alignment direction of the liquid crystal changes in response to the applied voltages. As to the phase distribution corresponding to the refractive index distribution in the liquid crystal element 14 of the present embodiment, description will be given later.

Figure 5:
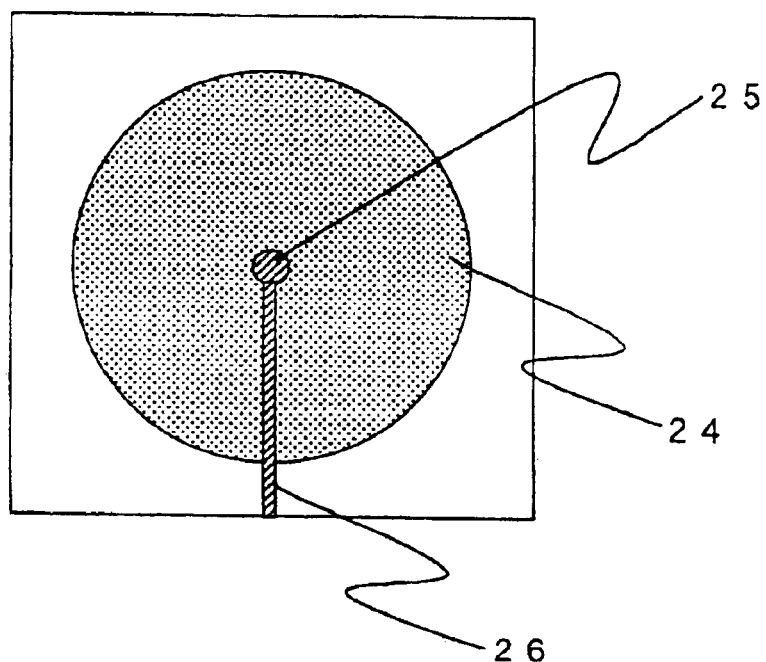
FIG. 5 is a plan view showing another example how electrodes are arranged in the liquid crystal element.

The following will explain another example of an arrangement of the electrodes provided for the liquid crystal element 14 so as to change the alignment state of the liquid crystal 15. Namely, the electrodes may be so arranged that a terminal 25 for voltage application is provided at a central portion of a circular electrode 24, and a lead wire 26 for supplying power is provided so as to extend outward from the terminal 25, as shown in FIG. 5. This arrangement can form a voltage distribution in which the voltage is the largest at the central portion and becomes smaller toward the peripheral portions. This enables the aberration correcting optical system 5 to impart a small refractive index at the central portion and a gradually larger refractive index toward the peripheral portions.

Note that, the combination of the shapes and resistance values of the electrodes as described above is only an example. The shapes and resistance values of the electrodes may be suitably designed for different types of pickup devices having different aberrations to be corrected.

Further, in the foregoing exemplary arrangement of the electrodes, the electrodes having a high resistance and a low resistance are combined to form the electric field with the largest central portion and smaller peripheral portions. Alternatively, the thickness of the transparent electrode may be changed to suitably form a voltage distribution.

Next, the following will explain a method to minimize an amount of spherical aberration in case where the light transmission layer 8 has an uneven thickness in the optical recording medium 10.

For example, when the mean value (median value) of the thickness of the light transmission layer 8 is 0.1 mm, the optical pickup device is arranged to enable recording and reproducing for a thickness of 0.1 mm±0.015 mm. In other words, to accommodate a multi-layer recording medium, the optical pickup device is arranged to enable recording and reproducing as long as the thickness of the light transmission layer 8 falls within a predetermined allowable range, even if the thickness does not exactly have a predetermined mean value. The spherical aberration caused by the uneven thickness of the light transmission layer 8, and the corresponding spherical aberration on the recording layer 9 can be corrected by varying the voltages applied to the electrodes 18a, 18b, and 18c of the liquid crystal element 14.

Next, description is made as to how spherical aberration is corrected by the phase distribution in the liquid crystal element 14.

Figure 6:
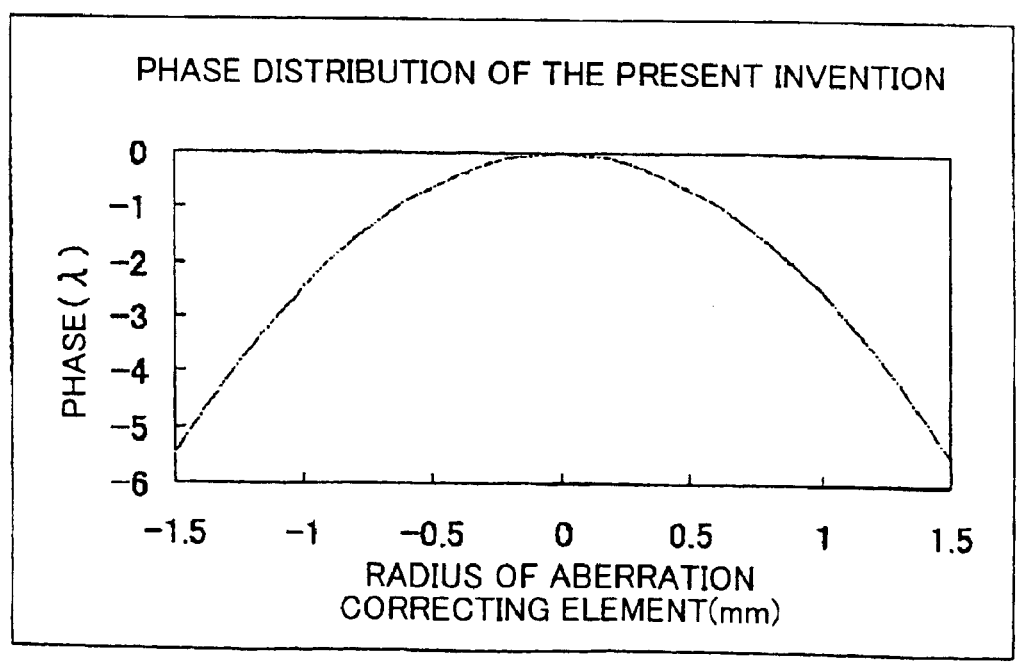
FIG. 6 is a graph showing a phase distribution of the aberration correcting optical system of FIG. 1.

FIG. 6 shows a phase distribution of the liquid crystal element 14 when the thickness of the light transmission layer 8 is 0.115 mm (a gain of +15 $\mu$m).

Using a position r distanced in a radius direction from the center of the liquid crystal element 14 provided as an aberration correcting element, the phase distribution shown in FIG. 6 is approximated by a polynominal expression as follows.

$$\Phi(r)=0.000021083 \times r^4 - 0.001033 \times r^2.$$

Further, a second-order differential function $\Phi''(r)$, which indicates the rate of change in the slope of the phase distribution $\Phi(r)$, is expressed as follows.

$$\Phi''(r)=0.000252996 \times r^2 - 0.002066.$$

Figure 7:
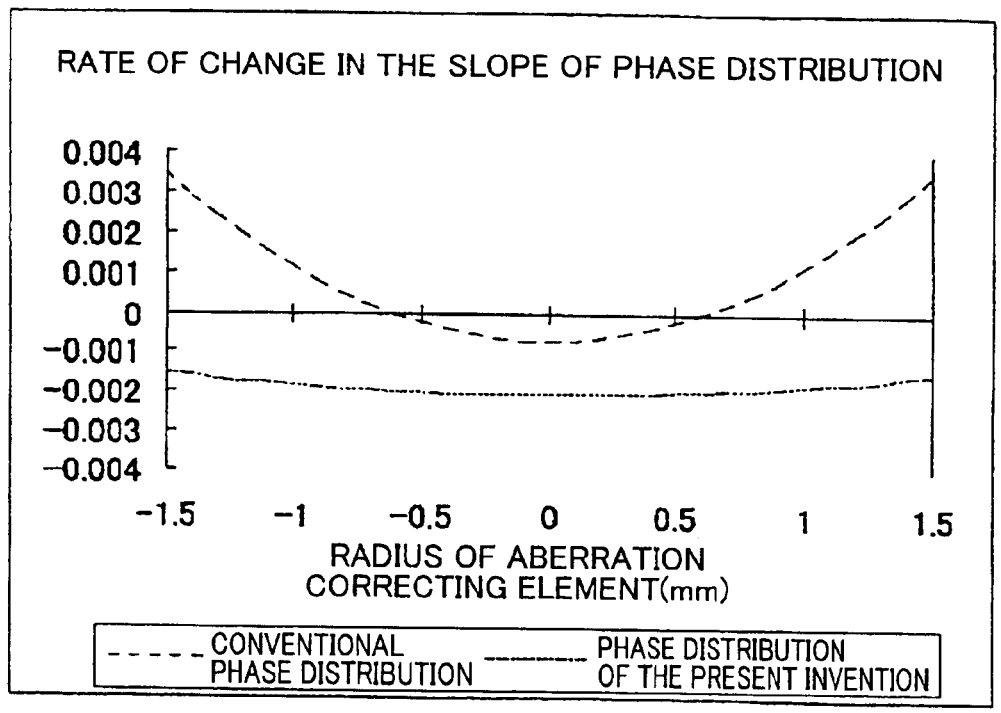
FIG. 7 is a graph showing a change in the slope of the phase distribution of the aberration correcting optical system of FIG. 1.

Note that, FIG. 7 shows the rate of change in the slope of the phase distribution Φ(r) of the present invention. FIG. 7 also shows the rate of change in the slope of a conventional phase distribution.

As is clear from FIG. 7, Φ"(r) of the present embodiment has only negative values, so that the phase distribution Φ(r) has no inflection point.

Figure 8:
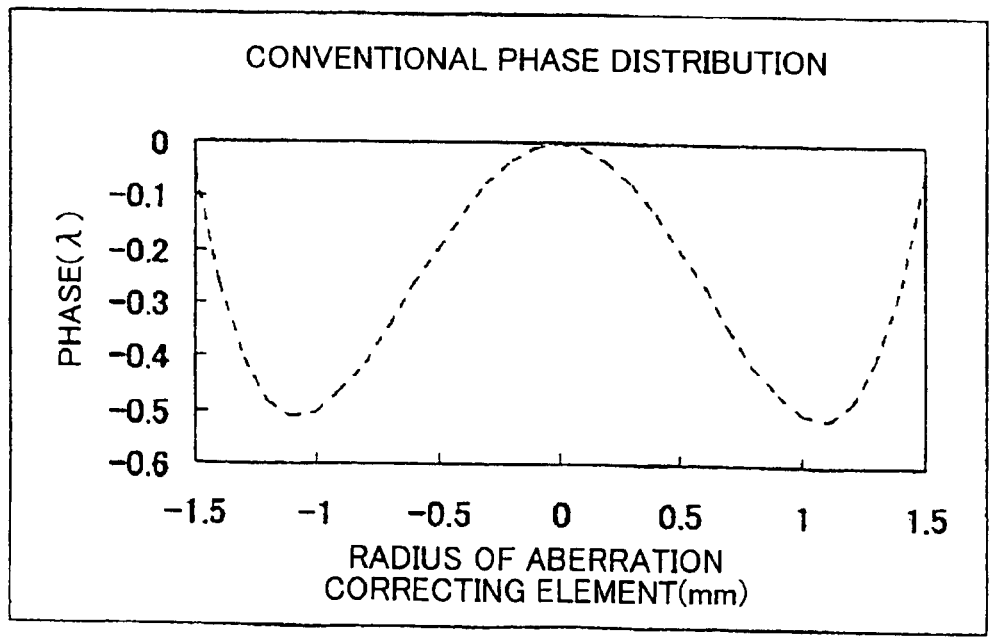
FIG. 8 is a graph showing a phase distribution of a conventional aberration correcting optical system.
Figure 9:
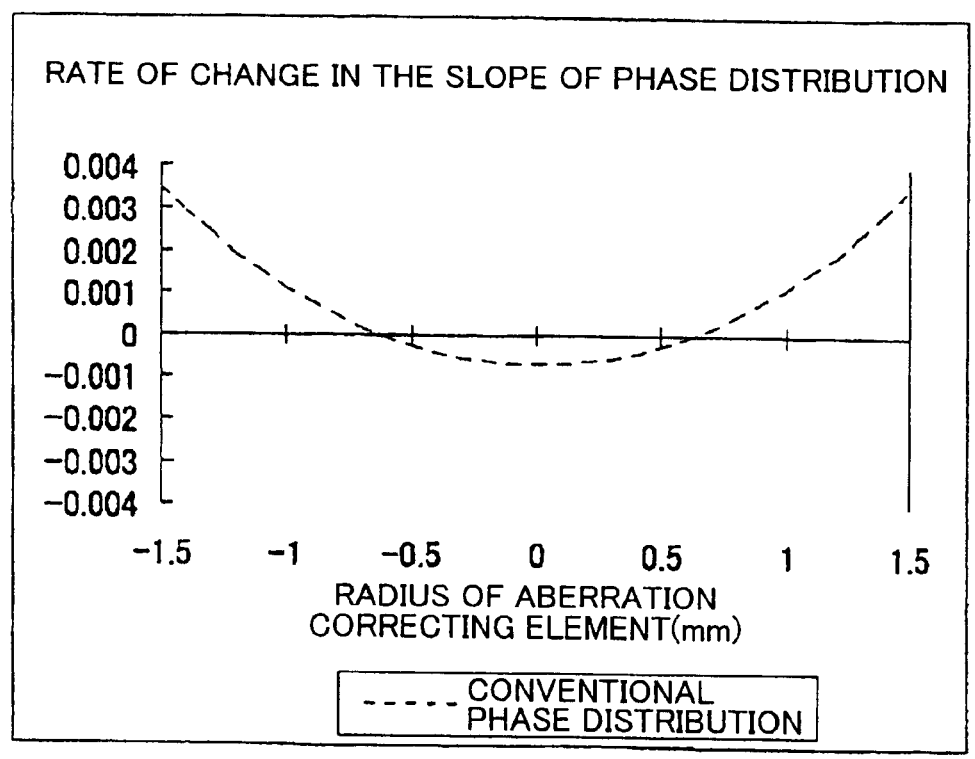
FIG. 9 is a graph showing a change in the slope of the phase distribution of the aberration correcting optical system of the conventional example.

In the conventional arrangement as shown in FIG. 8 for example, the phase distribution has an inflection point because there are points at which the rate of change of the slope is 0 as shown in FIG. 7. In this case, the phase distribution has a minimum value at positions in the vicinity of, for example, r=±1.1 mm, not the center r=0.

The light is subjected to the phase distribution as it passes through the liquid crystal element, and enters the objective lens after its wavefront as an equiphase surface is transformed according to the phase distribution in the liquid crystal element.

Therefore, when the centers of the objective lens and the liquid crystal element are aligned with each other, the wavefront of incident light on the objective lens has no disturbance on positions corresponding to the minimum value of the phase distribution. On the other hand, when the centers of the objective lens and the liquid crystal element are misaligned with each other, the wavefront of incident light on this part of the objective lens has a disturbance according to a direction of the misalignment. Consequently, a wavefront of the opposite phase may be incident depending on the direction of the misalignment. This may cause a large aberration in this part of the objective lens, for example.

In contrast, in the arrangement shown in FIG. 7, the phase distribution has no inflection point. Accordingly, the phase distribution does not have a minimum value at a point other than the center of the phase distribution. With this, a large aberration does not occur because the wavefront is not seriously disturbed at points other than the center of the phase distribution. As a result, wavefront aberration can be reduced.

Further, as shown in FIG. 7, a second derivative value of the phase distribution of the present embodiment is sufficiently small at positions with a radius of 1.5 mm, i.e., the outermost portion of the effective diameter of the laser beam. With this, the wavefront of the incident light on a particular portion of the objective lens is not greatly disturbed even when the centers of the objective lens and the liquid crystal element are misaligned. As a result, wavefront aberration can be reduced.

Here, at positions in the vicinity of R=±0.6 mm, the phase distribution of the conventional arrangement has points at which the rate of change in the slope of the phase distribution changes its sign. For example, when the objective lens is shifted in a positive direction (direction of increasing radius) with respect to the liquid crystal element, the rate of change in the slope of the phase distribution decreases at r=+0.6 mm. On the other hand, with this shift, the rate of change in the slope of the phase distribution at a position of r=−0.6 mm increases and has a sign opposite to that at r=+0.6 mm. This causes a large aberration.

Incidentally, the phase distribution imparted by the liquid crystal element 14 in accordance with an amount of spherical aberration is generally expressed as follows.

$$\Phi(r) = a \times r^4 + b \times r^2$$

Accordingly, a second-order differential function Φ"(r) of Φ(r) is expressed as follows.

$$\Phi''(r) = 12a \times r^2 + 2 \times b$$

It is assumed that R is an effective radius of the aberration correcting optical system. Here, it is required that Φ"(r)≠0 within a range of R>r>0 in order to meet the condition that Φ(r) has no inflection point within the range of R>r>0. Namely, it is necessary to satisfy the following:

a>0 and b>0; or
a<0 and b<0; or
$\{-b/(6 \times a)\}^{(1/2)}$>R.

From this it follows that Φ(r) has no inflection point within the range of R>r>0 when:

a×b>0; or
$\{-b/(6 \times a)\}^{(1/2)}$>R are satisfied where a×b<0.

Further, within the range of R>r>0, the objective lens has the largest incident angle in the vicinity of the effective radius R. Thus, when the wavefront of incident light has a large disturbance (namely incident angle) in the vicinity of the effective radius R, more aberration is caused. This means that more aberration is caused when the centers of the objective lens and the liquid crystal element are misaligned.

Therefore, it is necessary that the value of Φ"(r) is sufficiently small in the vicinity of the effective radius (outermost portion) of the aberration correcting optical system, in order to reduce aberration.

Here, it is necessary to provide a margin of approximately 0.3 mm for the shift of the objective lens. Thus, in order to obtain an aberration of not more than 0.03 λrms, the optical system having an NA of 0.85 is required to satisfy the following relationship.

$$|12 \times a \times R^2| < 0.002$$

When the phase distribution of the liquid crystal element correcting a predetermined spherical aberration satisfies the foregoing condition, the wavefront emerging from the liquid crystal element and entering the objective lens will not be seriously disturbed even when the centers of the liquid crystal element and the objective lens are misaligned. As a result, aberration can be reduced.

Next, Table 1 shows aberration values that resulted from shifting of the objective lens in tracking in a direction of the track width when, for example, the optical pickup device of the present embodiment was used to correct aberration for a light transmission layer having a thickness of 115 μm (for reference, Table 1 also shows aberration values that resulted from the phase distribution of the conventional example). Note that, mλ (millilambda), which is shown as the unit of aberration value, is a rms (root mean square) value, but the notation rms is omitted in the table.

TABLE 1

|  | CENTER MISALIGNMENT | | |
| --- | --- | --- | --- |
|  | 0 mm | 0.1 mm | 0.2 mm |
| PRESENT EMBODIMENT | 12 mλ | 13 mλ | 15 mλ |
| CONVENTIONAL EXAMPLE | 12 mλ | 72 mλ | 151 mλ |

By comparing the present embodiment and the conventional example, it can be seen from Table 1 that the aberration values in the present embodiment are sufficiently smaller than the aberration values in the conventional example for a given amount of center misalignment.

Note that, even though the present embodiment uses a liquid crystal element as the aberration correcting element, other elements may also be used as long as the phase distribution as described above can be obtained. For example, the effects of the present embodiment can also be obtained with other elements, including one using a material whose refractive index can be adjusted by changing the applied voltage. Further, the spherical aberration values obtained in this example are based on the light transmission layer with a thickness range of ±15 μm, but the thickness of the light transmission layer is not limited to this and may be determined by a spherical aberration to be corrected in different systems.

Further, the objective lens having an NA of 0.85 is used in the present embodiment. Generally, a pickup which uses an objective lens whose NA is not less than 0.75 causes a large amount of spherical aberration with respect to a change in thickness of the light transmission layer in two-layer recording and the like. Therefore, with the liquid crystal element (aberration correcting element) of the present embodiment, strong aberration correction effects can be obtained.

Incidentally, a tertiary spherical aberration coefficient W40 is expressed as follows.

$$W40 \approx (t/8) \times \{(n^2-1)/n^3\} \times (NA)^4$$

Namely, for a given change in the thickness of the light transmission layer, the amount of spherical aberration for NA=0.75 is two times or greater than that for NA=0.6. In a two-layer recording (reproducing) medium, a thickness between the layers is determined by such factors as thermal interference between the recording layers, interference of a focus servo signal, and a method for manufacturing an interlayer layer Specifically, the thickness between the layers is at least about 10 μm to 20 μm. Due to unevenness in the thickness between the layers, the amount of spherical aberration exceeds the allowable aberration value of 0.03 λrms when NA is 0.75.

Therefore, in an optical system having such a high NA, the aberration can be reduced more effectively and characteristics of the optical pickup can be improved by using the aberration correcting element of the present embodiment. The aberration correcting element of the present invention is particularly important in an optical system having an objective lens whose NA is not less than 0.75, because the aberration needs to be suppressed at low level in such an optical system.

In one aspect of the invention, the present invention provides an optical pickup device including an aberration correcting optical element for changing a wavefront of incident light passing through the aberration correcting optical element, the wavefront being an equiphase surface, in which the aberration correcting optical element includes an electrode formed on a substrate, an optical medium whose refractive index with respect to the incident light changes in accordance with a voltage applied to the electrode, and a driving circuit which applies a voltage to the electrode; the driving circuit applies a voltage to the electrode so as to change the refractive index of the optical medium and thereby shift a phase of the wavefront of the incident light passing through the optical medium; and the driving circuit applies a voltage to the electrode so that an amount of phase shift caused by the optical medium monotonously increases or decreases in accordance with a distance from an optical axis of the incident light.

The optical pickup device of the present invention may be so arranged that the driving circuit applies a voltage to the electrode so as to form a phase distribution as a function of radius r when R>r>0:

$$\Phi(r) = a \times r^4 + b \times r^2,$$

where the radius r is the distance from the optical axis of the incident light, and R is an effective radius of the aberration correcting optical system.

Further, the optical pickup device of the present invention may be so arranged that the driving circuit applies a voltage to (A) a center electrode which is located on the optical axis of the incident light and (B) a circular electrode which is located around the center electrode, so that an amount of phase shift caused by the optical medium monotonously increases or decreases in accordance with the distance from the optical axis of the incident light.

As described above, the optical pickup device of the present invention has a large tolerance for the center misalignment with the objective lens, thereby eliminating the need for mounting the aberration correcting element on the actuator together with the objective lens. This reduces the weight of the actuator, thereby realizing high-speed driving of the actuator.

Further, it is possible to stably record and reproduce information on and from an optical disk by providing the optical pickup device of the present invention in an optical disk reproducing device or an optical disk recording-reproducing device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

An optical pickup device of the present invention can prevent deterioration due to center misalignment of an objective lens with a liquid crystal element even when the objective lens has a high NA. Thus, the optical pickup device is suitable for increasing the recording capacity of an optical recording medium. Further, the optical pickup device can drive an actuator at high speed, by reducing the weight of the actuator.

What is claimed is:

1. An optical pickup device comprising: a light source; and an objective lens and an aberration correcting optical system which are located in a light path from said light source to an optical recording medium, wherein:

said aberration correcting optical system has a phase distribution for a light beam passing through said aberration correcting optical system, so as to correct a predetermined aberration; and said aberration correcting optical system for correcting an aberration is set so that a magnitude of a phase in the phase distribution increases with increase in distance from a point where said aberration correcting optical system crosses an optical axis of light emitted from said light source.

2. The optical pickup device as set forth in claim 1, wherein:

the phase distribution of said aberration correcting optical system is approximated by a function $$\Phi(r) = a \times r^4 + b \times r^2,$$

where $\Phi(r)$ is a phase at a radius r, r is a radius, and a and b are phase distribution coefficients.

3. The optical pickup device as set forth in claim 2, wherein:

the phase distribution coefficients a and b satisfy:

$$a \times b > 0; \text{ or}$$

$$a \times b < 0 \text{ and } \{-b/(6 \times a)\}^{(1/2)} > R,$$

where R is an effective radius of said aberration correcting optical system.

4. The optical pickup device as set forth in claim 3, wherein:

the phase distribution coefficient a satisfies:

$$|12 \times a \times R^2| < 0.002.$$

5. The optical pickup device as set forth in any one of claims 1 through 4, wherein:

said objective lens has an NA of not less than 0.75; and said aberration correcting optical system comprises a liquid crystal element.

6. An optical pickup device comprising an aberration correcting optical element for changing a wavefront of incident light passing through the aberration correcting optical element, the wavefront being an equiphase surface, wherein:

said aberration correcting optical element includes an electrode formed on a substrate, an optical medium whose refractive index with respect to the incident light changes in accordance with a voltage applied to said electrode, and a driving circuit which applies a voltage to said electrode;

said driving circuit applies a voltage to said electrode so as to change the refractive index of said optical medium and thereby shift a phase of the wavefront of the incident light passing through the optical medium; and said driving circuit applies a voltage to said electrode so that an amount of phase shift caused by said optical medium monotonously increases or decreases in accordance with a distance from an optical axis of the incident light.

7. The optical pickup device as set forth in claim 6, wherein:

said driving circuit applies a voltage to said electrode so as to form a phase distribution as a function of radius r when R>r>0:

$$\Phi(r) = a \times r^4 + b \times r^2,$$

where the radius r is the distance from the optical axis of the incident light, and R is an effective radius of said aberration correcting optical system.

8. The optical pickup device as set forth in claim 6, wherein:

said driving circuit applies a voltage to (A) a center electrode which is located on the optical axis of the incident light and (B) a circular electrode which is located around the center electrode, so that an amount of phase shift caused by said optical medium monotonously increases or decreases in accordance with the distance from the optical axis of the incident light.

* * * * *